US012581204B2

(12) United States Patent
Ono et al.

(10) Patent No.: US 12,581,204 B2
(45) Date of Patent: Mar. 17, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Taishi Ono, Stuttgart (DE); Yuhi Kondo, Tokyo (JP); Legong Sun, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 106 days.

(21) Appl. No.: 18/276,364

(22) PCT Filed: Jan. 4, 2022

(86) PCT No.: PCT/JP2022/000051
§ 371 (c)(1),
(2) Date: Aug. 8, 2023

(87) PCT Pub. No.: WO2022/196038
PCT Pub. Date: Sep. 22, 2022

(65) Prior Publication Data
US 2024/0129642 A1 Apr. 18, 2024

(30) Foreign Application Priority Data
Mar. 19, 2021 (JP) ................................. 2021-045676

(51) Int. Cl.
*H04N 23/88* (2023.01)
*G06V 10/56* (2022.01)

(52) U.S. Cl.
CPC ............. *H04N 23/88* (2023.01); *G06V 10/56* (2022.01)

(58) Field of Classification Search
CPC ...... H04N 23/88; H04N 25/134; G06V 10/56; G06V 10/26
See application file for complete search history.

(56) References Cited

U.S. PATENT DOCUMENTS

| | | | | |
|---|---|---|---|---|
| 9,077,945 | B2 * | 7/2015 | Ueda | H04N 23/88 |
| 2016/0275660 | A1 * | 9/2016 | Yamamoto | G06T 5/90 |

(Continued)

FOREIGN PATENT DOCUMENTS

| | | | |
|---|---|---|---|
| JP | 2007129622 A | * | 5/2007 |
| JP | 4447520 B2 | | 4/2010 |

(Continued)

OTHER PUBLICATIONS

Afifi et al., Deep White-Balance Editing, CVPR, 2020, pp. 1397-1406.

*Primary Examiner* — Abdelaaziz Tissire
(74) *Attorney, Agent, or Firm* — Paratus Law Group, PLLC

(57) ABSTRACT

The achromatic region extraction unit calculates achromatic determination information for each color component of the color polarized image using the polarization information acquired from the color polarized image, and extracts a region satisfying a condition that the achromatic determination information is achromatic as an achromatic region. The gain setting unit sets the white balance gain used in the white balance adjustment of the color polarized image on the basis of the white balance gain with which the achromatic region extracted by the achromatic region extraction unit becomes achromatic. For example, the gain setting unit sets the white balance gain for the entire color polarized image on the basis of the white balance gain of the achromatic region, or sets the white balance gain of a region different from the achromatic region on the basis of the white balance gains of a plurality of achromatic regions. The white balance adjustment can be easily performed on the basis of the polarization information.

18 Claims, 12 Drawing Sheets

(56)     References Cited

U.S. PATENT DOCUMENTS

| | | | | |
|---|---|---|---|---|
| 2018/0013988 A1* | 1/2018 | Kondo | ................. | H04N 25/134 |
| 2018/0308217 A1* | 10/2018 | Kurita | ........................ | G06T 7/90 |
| 2020/0068182 A1* | 2/2020 | Kondo | ................. | H04N 23/10 |
| 2021/0152749 A1* | 5/2021 | Kurita | .................... | H04N 23/56 |
| 2021/0264147 A1* | 8/2021 | Kadambi | .............. | G06V 10/60 |
| 2021/0264607 A1* | 8/2021 | Kalra | .................. | G06V 10/147 |
| 2021/0281786 A1* | 9/2021 | Kurita | .................... | H04N 25/71 |
| 2022/0210322 A1* | 6/2022 | Hirasawa | .................. | G06T 5/50 |
| 2022/0295038 A1* | 9/2022 | Venkataraman | ..... | H04N 13/271 |
| 2024/0205551 A1* | 6/2024 | Totsuka | ................. | H04N 23/88 |

FOREIGN PATENT DOCUMENTS

| | | | | | |
|---|---|---|---|---|---|
| WO | WO 2018/037678 A1 | 3/2018 | | | |
| WO | WO-2018042815 A1 * | 3/2018 | .......... | H04N 17/002 | |
| WO | WO 2018/061508 A1 | 4/2018 | | | |
| WO | WO-2019102698 A1 * | 5/2019 | ....... | H01L 27/14625 | |
| WO | WO 2020/214348 A1 | 10/2020 | | | |
| WO | WO-2020213238 A1 | 10/2020 | | | |

* cited by examiner (a) SUBJECT LIGHT (b) SUBJECT LIGHT (c) SUBJECT LIGHT

ROTATION (d) SUBJECT LIGHT

R : RED PIXEL

G : GREEN PIXEL

B : BLUE PIXEL

W : WHITE PIXEL

: 0°

: 45°

: 90°

: 135°

(b)

(a)

(b)

(a)

(c)

(b)

(a)

(a)

(b)

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/000051 (filed on Jan. 4, 2022) under 35 U.S.C. § 371, which claims priority to Japanese Patent Application No. 2021-045676 (filed on Mar. 19, 2021), which are all hereby incorporated by reference in their entirety.

TECHNICAL FIELD

This technology relates to an information processing apparatus, an information processing method, and a program, and makes it possible to easily adjust white balance.

BACKGROUND ART

Conventionally, in a case where a subject is imaged using an imaging device, white balance adjustment is performed so that a white object is recognized as white. In the white balance adjustment, a white balance gain (hereinafter, simply referred to as "gain") is automatically set for each color component in consideration of a light source and the like of an imaging scene, and a signal level for each color component is adjusted with the set gain. For example, in a method called gray world, white balance adjustment is performed assuming that an average value of pixel values of the entire image becomes achromatic. In addition, as described in Patent Document 1, if a method of estimating a light source color using a reflection model of an object is used, white balance adjustment can be performed on the basis of the estimated light source color. Furthermore, Non-Patent Document 1 proposes a method of performing white balance adjustment using deep learning.

CITATION LIST

Patent Document

Patent Document 1: Japanese Patent No. 4447520

Non-Patent Document

Non-Patent Document 1: Afifi, Mahmoud and Brown, Michael S. Deep White-Balance Editing, CVPR 2020.

SUMMARY OF THE INVENTION

Problems to be Solved by the Invention

By the way, in the method called gray world, since the average color of the image is treated as the light source color, the accuracy decreases in a case where a hypothesis is not established such as when the average color of the object is biased. In addition, since the average of the entire image is used, it is difficult to cope with a scene in which the light source color differs for each region.

In addition, in the method of estimating the light source color disclosed in Patent Document 1, specularly reflected light is extracted assuming that a luminance value in an image is constituted by "only diffuse reflection light" or "diffuse reflection light+specular reflection light", and this is treated as the light source color. However, since the intensity of the diffuse reflection light actually changes depending on the texture or the object normal, it is necessary to select a pair that is not affected by the texture or the object normal. In addition, the assumption that "only diffuse reflection light" is a very strict assumption, and it is also difficult to find a pixel in which this assumption holds. Furthermore, a method using deep learning can use a context such as an object, an environment, and a time zone in an image, but depends on learning data, and requires very heavy and complicated processing.

Therefore, an object of this technology is to provide an information processing apparatus, an information processing method, and a program capable of easily adjusting white balance using a color polarized image.

Solutions to Problems

A first aspect of the present technology is
an information processing apparatus including:
an achromatic region extraction unit that extracts an achromatic region in a color polarized image by using polarization information acquired from The color polarized image; and
a gain setting unit that sets a white balance gain used in white balance adjustment of the color polarized image to a white balance gain with which the achromatic region extracted by the achromatic region extraction unit is achromatic.

In this technology, the achromatic region extraction unit extracts an achromatic region in the color polarized image using the polarization information acquired from the color polarized image. For example, the achromatic region extraction unit calculates a degree of linear polarization as achromatic determination information for each color component of the color polarized image by using the polarization information, and sets a region in which variation between the color components of the degree of linear polarization is within a preset achromatic region determination criterion as an achromatic region. In addition, the achromatic region extraction unit calculates a Stokes vector as the achromatic determination information, and sets, as an achromatic region, a region in which variation between color components is within a preset achromatic region determination criterion with respect to a ratio of a plurality of components of the Stokes vector. In this case, the achromatic region extraction unit uses a component indicating at least unpolarized luminance or average luminance as the plurality of components.

The gain setting unit sets the white balance gain used in the white balance adjustment of the color polarized image to a white balance gain at which the achromatic region extracted by the achromatic region extraction unit becomes achromatic. The white balance gain of the region different from the achromatic region is set by interpolation processing using the white balance gain set for each achromatic region. Furthermore, the gain setting unit sets a white balance gain used in the entire region of the color polarized image or a white balance gain of a region different from the achromatic region on the basis of the white balance gain set for each achromatic region. Furthermore, the gain setting unit may perform the interpolation processing using the white balance gain of the achromatic region adjacent. For example, the achromatic region extraction unit performs class classification of the extracted achromatic region, and the gain setting unit sets a white balance gain and a position set for each class classified by the class classification as a white balance gain and a position of the achromatic region adjacent.

Furthermore, the gain setting unit may perform region division of the color polarized image and set the white balance gain in units of divided regions.

Furthermore, the gain setting unit may switch the setting of the white balance gain for the color polarized image according to the variation in the white balance gain set for each achromatic region extracted by the achromatic region extraction unit. For example, in a case where the variation in the white balance gain is within a preset allowable range, the gain setting unit sets the white balance gain used in the entire region of the color polarized image on the basis of the white balance gain set for each achromatic region. Furthermore, in a case where the variation in the white balance gain exceeds the allowable range, the gain setting unit sets the white balance gain of a region different from the achromatic region on the basis of the white balance gain set for each achromatic region.

A second aspect of the present technology is an information processing method including:

extracting, by an achromatic region extraction unit, an achromatic region in a color polarized image by using polarization information acquired from the color polarized image; and setting, by a gain setting unit, a white balance gain used in white balance adjustment of the color polarized image to a white balance gain with which the achromatic region extracted by the achromatic region extraction unit is achromatic.

A third aspect of the present technology is a program for causing a computer Co execute white balance adjustment, the program causing the computer to perform a procedure of extracting an achromatic region in a color polarized image by using polarization information acquired from the color polarized image, and a procedure of setting a white balance gain used in white balance adjustment of the color polarized image to a white balance gain with which the extracted achromatic region is achromatic.

Note that, the program of the present technology is the program that may be provided by a storage medium and a communication medium provided in a computer-readable form, for example, a storage medium such as an optical disk, a magnetic disk, and a semiconductor memory, or a communication medium such as a network to a general-purpose computer capable of executing various program codes, for example. By providing such program in the computer-readable form, processing according to the program is implemented on the computer.

MODE FOR CARRYING OUT THE INVENTION

Figure 1:
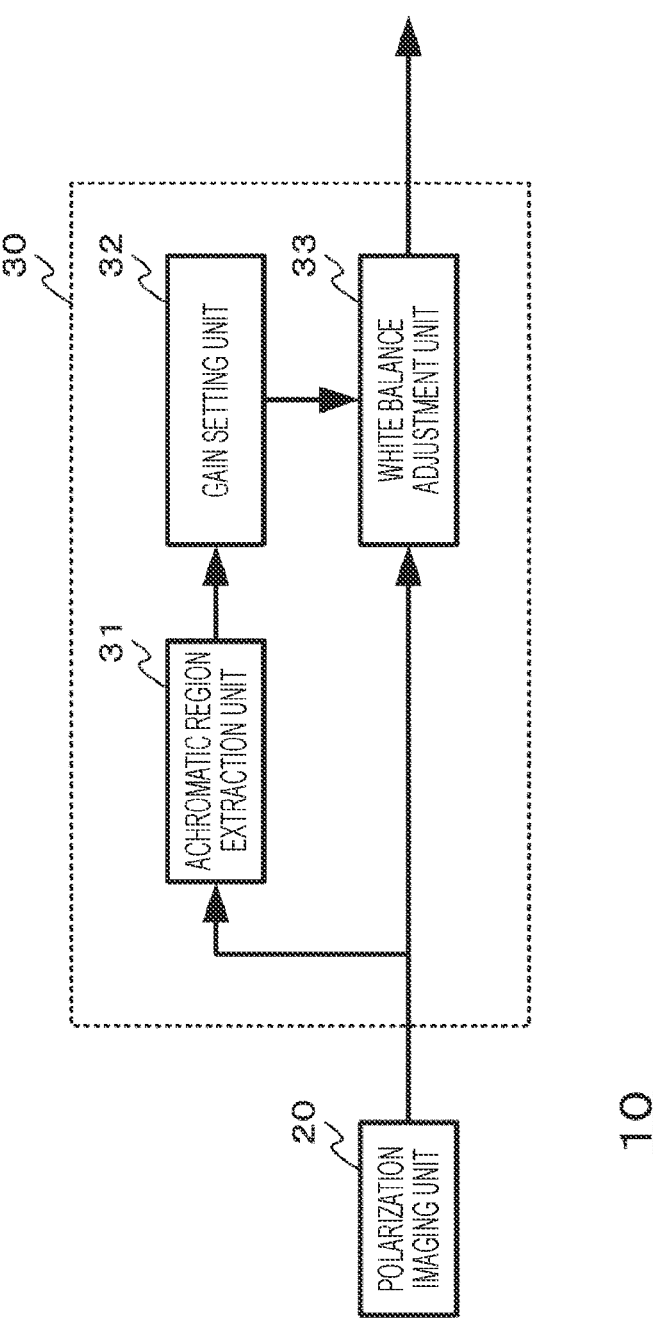
FIG. 1 is a diagram illustrating a configuration of an imaging system.

Hereinafter, modes for carrying out the present technology will be described. Note that description will be provided in the following order.

1. About Extraction of Achromatic Region Using Polarization information

2. Embodiments 2-1. Configuration of Embodiments 2-2. Operation of Embodiments 2-3. About Gain Setting Processing

1. About Extraction of Achromatic Region Using Polarization Information

The information processing apparatus according to the present technology extracts an achromatic region using polarization information acquired from a color polarized image, and sets a white balance gain (hereinafter, simply referred to as "gain") used in white balance adjustment of the color polarized image to a gain at which the extracted achromatic region becomes achromatic. Note that, in the following description, a case will be described in which the color space of the color polarized image is an RGB color space, and gains for respective color components of R (red), G (green), and B (blue), which are three primary colors, are set.

In a case where the achromatic region is extracted using the polarization information, the information processing apparatus uses a Stokes vector capable of expressing a polarization state. The components of the Stokes vector are indicated by four components $s0$, $s1$, $s2$, and $s3$, and when the polarization state is expressed by the Stokes vector, the conversion of the polarization can be expressed by a Muller matrix. In the Stokes vector, the component $s0$ indicates unpolarized luminance or average luminance. In addition, the component $s1$ represents a difference in intensity (luminance difference) between when the polarization direction of the polarizer is 0° and when the polarization direction of the polarizer is 90°, the component $s2$ represents a difference in intensity (luminance difference) between when the polarization direction of the polarizer is 45° and when the polarization direction of the polarizer is 135°, and the component $s3$ represents the degree of polarization of circularly polarized light. Note that, as described later, since a color polarized image is acquired using a linear polarizer as a polarizer, in the present technology, an achromatic region is extracted using components $s0$, $s1$, and $s2$.

The Muller matrix of the object can be expressed by a linear sum of a matrix Ms indicating specular reflection and a matrix Md indicating diffuse reflection. In this case, the weight of each color component regarding specular reflection is equally "ks", and the weight regarding diffuse reflection is set such that the weight of the red component is "kdR", the weight of the green component is "kdG", and the weight of the blue component is "kdB".

In this case, when the Stokes vector of the incident light is expressed as "$kR(s0, s1, s2)^T$", $kG(s0, s1, s2)^T$, $kB(s0, s1, s2)^T$y38 , the Stokes vector of the observation light can be expressed by Expressions (1) to (3). In addition, in a case where the object is achromatic, the relationship of Expression (4) is established.

[Math. 1]

$$(k_s M_s + k_{dR} M_d) \cdot k_R \begin{pmatrix} s_0 \\ s_1 \\ s_2 \end{pmatrix} \quad (1)$$

$$(k_s M_s + k_{dG} M_d) \cdot k_G \begin{pmatrix} s_0 \\ s_1 \\ s_2 \end{pmatrix} \quad (2)$$

$$(k_s M_s + k_{dB} M_d) \cdot k_B \begin{pmatrix} s_0 \\ s_1 \\ s_2 \end{pmatrix} \quad (3)$$

$$k_{dR} = k_{dG} = k_{dB} = k_d \quad (4)$$

Therefore, in a case where the object is achromatic, the Stokes vector of the observation light is expressed by Expressions (5) to (7).

[Math. 2]

$$(k_s M_s + k_d M_d) \cdot k_R \begin{pmatrix} s_0 \\ s_1 \\ s_2 \end{pmatrix} = k_R \begin{pmatrix} s'_0 \\ s'_1 \\ s'_2 \end{pmatrix} \quad (5)$$

$$(k_s M_s + k_d M_d) \cdot k_G \begin{pmatrix} s_0 \\ s_1 \\ s_2 \end{pmatrix} = k_G \begin{pmatrix} s'_0 \\ s'_1 \\ s'_2 \end{pmatrix} \quad (6)$$

$$(k_s M_s + k_d M_d) \cdot k_B \begin{pmatrix} s_0 \\ s_1 \\ s_2 \end{pmatrix} = k_B \begin{pmatrix} s'_0 \\ s'_1 \\ s'_2 \end{pmatrix} \quad (7)$$

Furthermore, the degree of linear polarization (DoLP) is expressed by Expressions (8) to (10). Here, in a case where the object is achromatic, since Expression (11) holds, as achromatic region can be extracted by searching for a region satisfying Expression (11).

[Math. 3]

$$DoLP_R = \frac{\sqrt{k_R^2 \cdot s_1'^2 + k_R^2 \cdot s_2'^2}}{k_R s_0'} = \frac{\sqrt{s_1'^2 + s_2'^2}}{s_0'} \quad (8)$$

$$DoLP_G = \frac{\sqrt{k_G^2 \cdot s_1'^2 + k_G^2 \cdot s_2'^2}}{k_G s_0'} = \frac{\sqrt{s_1'^2 + s_2'^2}}{s_0'} \quad (9)$$

$$DoLP_B = \frac{\sqrt{k_B^2 \cdot s_1'^2 + k_B^2 \cdot s_2'^2}}{k_B s_0'} = \frac{\sqrt{s_1'^2 + s_2'^2}}{s_0'} \quad (10)$$

$$DoLP_R = DoLP_G = DoLP_B \quad (11)$$

In addition, the extraction of the achromatic region using the polarization information is not limited to the case of using the degree of linear polarization DoLP, and other methods may be used. For example, the information processing apparatus extracts an achromatic region using a plurality of components of the Stokes vector. The component s0 of the Stokes vector indicates unpolarized luminance or average luminance. In addition, since the components s1 and s2 illustrate the intensity difference, the fluctuation due to the polarization state is larger than that of the component s0. Therefore, a plurality of components of the Stokes vector, for example, one component of two components is set as a component s0 indicating unpolarized luminance or average luminance.

The information processing apparatus calculates the ratio of the two components of the Stokes vector for each color component as illustrated in Expressions (12) to (14). In addition, in a case where the object is achromatic, the relationship of Expression (15) is established. Therefore, if a region satisfying Expression (15) is searched, an achromatic region can be extracted.

[Math. 4]

$$\text{0th component/1st component}_R = \frac{k_R s_0'}{k_R s_1'} = \frac{s_0'}{s_1'} \quad (12)$$

$$\text{0th component/1st component}_G = \frac{k_G s_0'}{k_G s_1'} = \frac{s_0'}{s_1'} \quad (13)$$

$$\text{0th component/1st component}_B = \frac{k_B s_0'}{k_B s_1'} = \frac{s_0'}{s_1'} \quad (14)$$

$$\text{0th component/1st component}_R = \quad (15)$$
$$\text{0th component/1st component}_G = \text{0th component/1st component}_B$$

2. Embodiments

2-1. Configuration of Embodiments

FIG. 1 illustrates a configuration of an imaging system using an information processing apparatus of the present technology. The imaging system 10 includes a polarization imaging unit 20 and an information processing apparatus 30.

Figure 2:
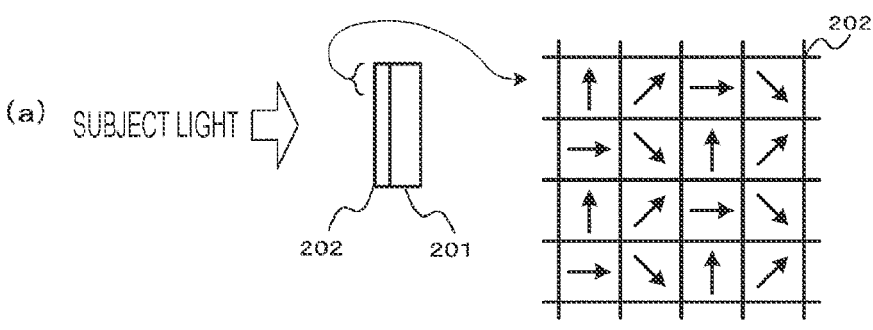
FIG. 2 is a diagram illustrating a configuration of a polarization imaging unit.
Figure 2:
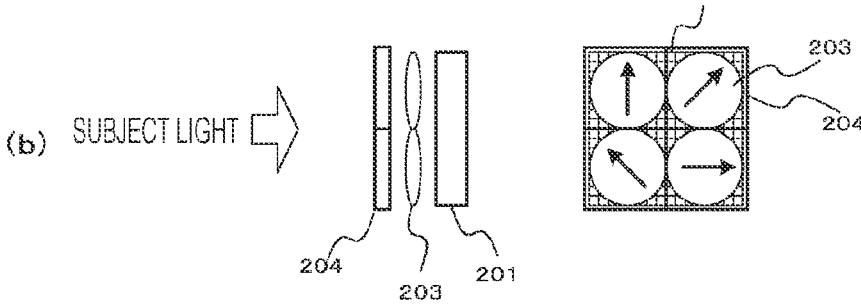
Figure 2:
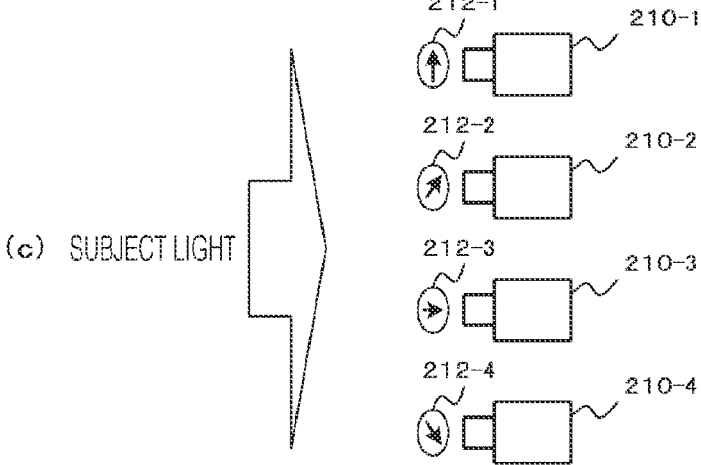
Figure 2:
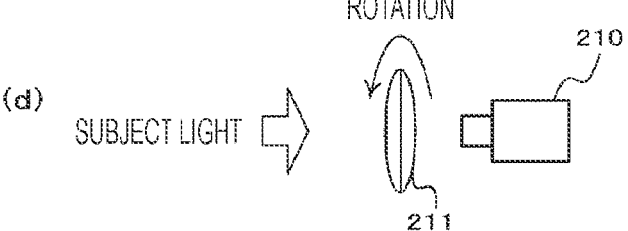

The polarization imaging unit 20 acquires a polarized image using a polarization element. FIG. 2 illustrates a configuration of the polarization imaging unit. For example, as illustrated in (a) of FIG. 2, the polarization imaging unit 20 acquires a polarized image by arranging a polarizing filter 202 having a pixel configuration in a plurality of polarization directions in an image sensor 201 such as a complementary metal oxide semiconductor (CMOS) or a charge coupled device (CCD). The polarizing filter 202 only needs to take out linearly polarized light from the subject light, and for example, a wire grid, photonic liquid crystal, or the like is used. Furthermore, in a case of acquiring a color polarized image, a color filter is provided on the incident surface side of the image sensor 201. Furthermore, as illustrated in (b) of FIG. 2, the polarization imaging unit 20 may generate a plurality of polarized images having different polarization directions using the configuration of a multi-lens array. For example, a plurality of (four in the drawing) lenses 203 is provided in front of the image sensor 201, and each lens 203 forms an optical image of a subject on an imaging surface of the image sensor 201. In addition, a polarizing plate 204 is provided in front of each lens 203, and a plurality of polarized images having different polarization directions is generated with the polarization directions of the polarizing plates 204 as different directions. By configuring the polarization imaging unit 20 in this manner, since a plurality of polarized images can be acquired by one imaging, the recognition processing of the subject to be recognized can be quickly performed. Furthermore, as illustrated in (c) of FIG. 2, as a configuration in which polarizing plates 212-1 to 212-4 having different polarization directions are provided in front of imaging units 210-1 to 210-4, a plurality of polarized images having different polarization directions may be generated from a plurality of different viewpoints.

Note that, in a case where the movement of the subject is slow or in a case where the subject operates stepwise, as illustrated in (d) of FIG. 2, a polarizing plate 211 may be provided in front of the imaging unit 210. In this case, the polarizing plate 211 is rotated to capture images in a plurality of different polarization directions, thereby acquiring a plurality of polarized images in different polarization directions.

Furthermore, in the cases of (b) and (c) of FIG. 2, if the positional interval of each lens 203 and the imaging units 210-1 to 210-4 is negligibly short with respect to the distance to the subject, the parallax can be ignored in a plurality of polarized images having different polarization directions. Therefore, by averaging the luminance of the polarized images having different polarization directions, it is possible to acquire an image equivalent to the non-polarization normal luminance image. Furthermore, in a case where the parallax cannot be ignored, it is possible to acquire an image equivalent to a non-polarization normal luminance image by aligning polarized images having different polarization directions according to the parallax amount and averaging the luminance of the aligned polarized images. Furthermore, in the case of (d) of FIG. 2, by averaging the luminance of the polarized images having different polarization directions for each pixel, an image equivalent to a non-polarization normal luminance image can be acquired.

Figure 3:
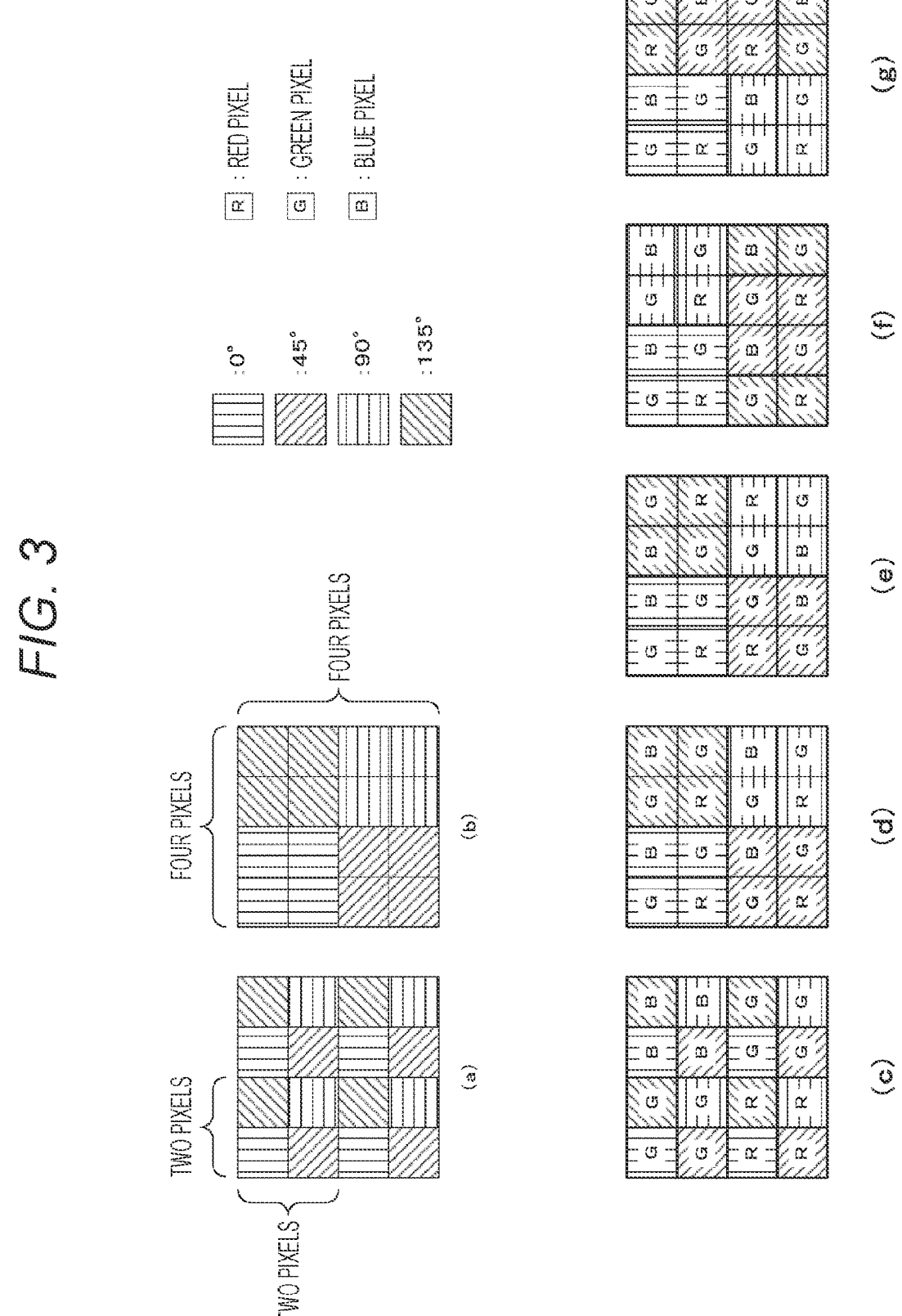
FIG. 3 is a diagram illustrating a pixel configuration in a plurality of polarization directions.
Figure 4:
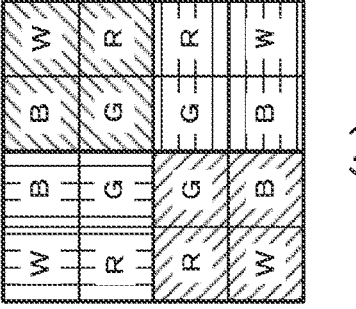
FIG. 4 is a diagram illustrating a pixel configuration in a plurality of polarization directions (in a case where three primary color pixels and white pixels are provided).
Figure 4:
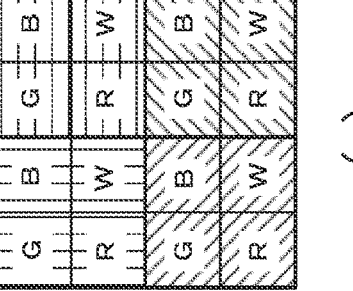
Figure 5:
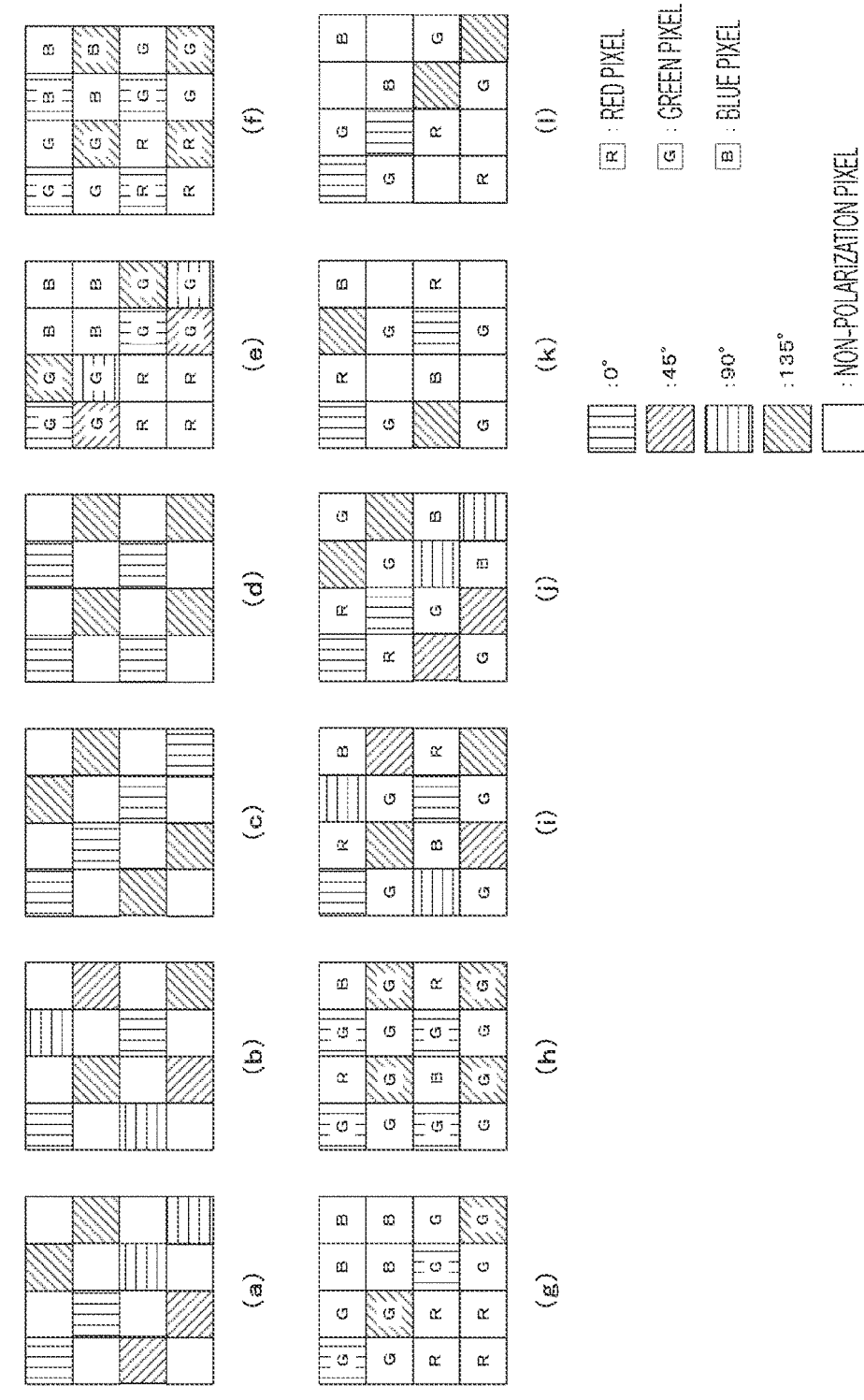
FIG. 5 is a diagram illustrating a pixel configuration in a plurality of polarization directions (in a case where non-polarization pixels are provided).

FIGS. 3 to 5 illustrate pixel configurations in a plurality of polarization directions, and the configurations illustrated in the drawings are repeated in The horizontal direction and the vertical direction. (a) and (b) of FIG. 3 illustrate the arrangement of the polarization pixels. Note that (a) of FIG. 3 illustrates a case where the polarization pixel block of 2×2 pixels includes, for example, polarization pixels having polarization directions (polarization angles) of 0 degrees, 45 degrees, 90 degrees, and 135 degrees. Furthermore, (b) of FIG. 3 illustrates a case where a polarization pixel block of 4×4 pixels includes, for example, polarization pixels having polarization directions of 0 degrees, 45 degrees, 90 degrees, and 135 degrees, with 2×2 pixels as a unit of polarization direction, Note that, in a case where the polarization component unit of The polarizing filter is 2×2 pixels as illustrated in FIG. 3 (*b*), the ratio of leakage of the polarization component from the region of the different adjacent polarization component unit to the polarization component obtained for each polarization component unit is smaller than that of the 1×1 pixel illustrated in FIG. 3 (*a*). In addition, in a case where the wire grid is used as the polarizing filter, the polarized light in which the electric field component is perpendicular to the direction of the grating (wire direction) is transmitted, and the transmittance increases as the wire is longer. Therefore, in a case where the polarization component unit is 2×2 pixels, the transmittance is higher than that of 1×1 pixels. Therefore, in a case where the polarization component unit is 2×2 pixels, the transmittance is higher than that of 1×1 pixels, and the extinction ratio can be improved.

(c) to (g) of FIG. 3 illustrate pixel configurations in a case where a color polarized image is acquired. (c) of FIG. 3 illustrates a case where the polarization pixel block of 2×2 pixels illustrated in (a) of FIG. 3 is set as one color unit, and three primary color pixels (red pixels, green pixels, and blue pixels) are arranged in a Bayer array.

(d) of FIG. 3 illustrates a case where three primary color pixels are provided in a Bayer array for each pixel block of 2×2 pixels in the same polarization direction illustrated in (b) of FIG. 3.

(e) of FIG. 3 illustrates a case where three primary color pixels are provided in a Bayer array for each pixel block of 2×2 pixels in the same polarization direction, and blocks of 2×2 pixels having different polarization directions are set as pixels of the same color.

(f) of FIG. 3 illustrates a case where, for the pixel block of the Bayer array in the same polarization direction of 2×2 pixels, the phase difference in the polarization direction from the pixel block adjacent in the horizontal direction is 90 degrees, and the phase difference in the polarization direction from the pixel block adjacent in the vertical direction is ±45 degrees.

(g) of FIG. 3 illustrates a case where, for the pixel block in the Bayer array in the same polarization direction of 2×2 pixels, the phase difference in the polarization direction from the pixel block adjacent in the vertical direction is 90 degrees, and the phase difference in the polarization direction from the pixel block adjacent in the horizontal direction is ±45 degrees.

FIG. 4 illustrates a case where three primary color pixels and white pixels are provided. For example, (a) of FIG. 4 illustrates a case where one green pixel is set as a white pixel in the pixel block of the Bayer array in the same polarization direction of 2×2 pixels illustrated in (b) of FIG. 3.

(b) of FIG. 4 illustrates a case where one green pixel is set as a white pixel and a block of 2×2 pixels having different polarization directions is set as a pixel having the same color in the pixel block of the Bayer array in the same polarization direction of 2×2 pixels illustrated in (c) of FIG. 3.

By providing the white pixel in this way, as disclosed in Patent Document "WO 2016/136085 A", the dynamic range in generating the normal line information can be expanded as compared with a case where the white pixel is not provided. In addition, since the white pixel has a favorable S/N ratio, the white pixel is less likely to be affected by noise in calculation of a color difference or the like.

FIG. 5 illustrates a case where non-polarization pixels are provided, and the polarization direction and the display of color pixels are similar to those in FIG. 3.

(a) of FIG. 5 illustrates a case where a pixel block of 4×4 pixels is configured using two pixel blocks of 2×2 pixels having four different polarization directions and two pixel blocks of 2×2 pixels including non-polarization pixels, and the pixel block of the polarization pixels is green pixels, the pixel block of the non-polarization pixels is red pixels or blue pixels, and pixel blocks (2×2 pixels) of the same color are provided as a Bayer array.

(b) of FIG. 5 illustrates a case where polarization pixels having a phase difference of 45 degrees are provided in an oblique direction in a pixel block of 2×2 pixels, and the polarization directions of the polarization pixels are set to two directions having a phase difference of 45 degrees, and illustrates a case where pixel blocks of three primary colors are provided as a Bayer array with a pixel block including a polarized image in two different polarization directions and two non-polarization pixels as a color unit.

(c) of FIG. 5 illustrates a case where a pixel block of 2×2 pixels is set as a color unit, pixel blocks of three primary colors are provided as a Bayer array, and polarization pixels in two different polarization directions are provided in a pixel block of green pixels.

(d) of FIG. 5 illustrates a case where the polarization pixels are provided similarly to (b) of FIG. 5, the pixel block including the polarized images of two different polarization directions and two non-polarization pixels is set to three green pixels, one non-polarization pixel is set to a red pixel, and one non-polarization pixel is set to a blue pixel in adjacent pixel blocks.

(e) and (f) of FIG. 5 illustrate a case where pixels of three primary colors are provided in a pixel block of 4×4 pixels using non-polarization pixels as color pixels. Furthermore, (g) and (h) of FIG. 5 illustrate a case where pixels of three primary colors are provided in a pixel block of 4×4 pixels, using a part of the non-polarization pixels as color pixels.

Note that the configurations illustrated in FIGS. 3 to 5 are examples, and other configurations may be used. Furthermore, in order to enable high-sensitivity imaging even at night or the like, a configuration in which infrared (IR) pixels are mixed and repeated may be adopted.

Figure 6:
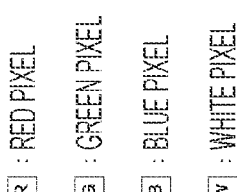
FIG. 6 is a diagram illustrating a case where polarization pixel blocks are thinned out.
Figure 6:
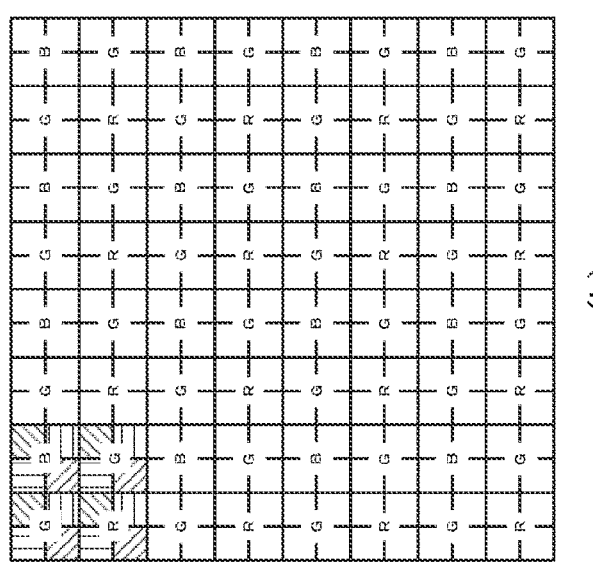
Figure 6:
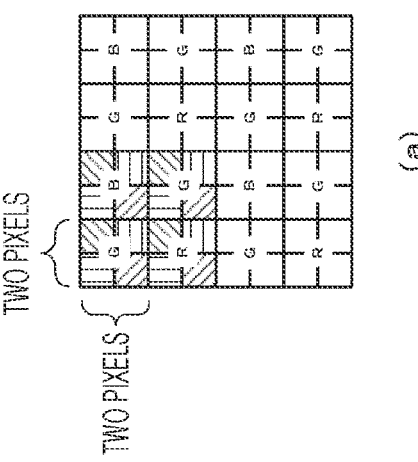

FIG. 6 illustrates a case where the polarization pixel blocks are thinned out. (a) of FIG. 6 illustrates a case where a polarization pixel block of 4×4 pixels is repeatedly provided for each block of 8×8 pixels. In this case, the pixels having the same color as the polarization direction has eight pixel cycles in each of the horizontal direction and the vertical direction.

(b) of FIG. 6 illustrates a case where a polarization pixel block of 4×4 pixels is repeatedly provided for each block of 16×16 pixels. In this case, the pixels having the same color as the polarization direction has 16 pixel cycles in each of the horizontal direction and the vertical direction. Note that the polarization pixel block may be provided such that pixels having the same color as the polarization direction have 32 pixel cycles or 64 pixel cycles in each of the horizontal direction and the vertical direction. Furthermore, the repetition cycle of the pixels having the same color as the polarization direction may be different between The horizontal direction and the vertical direction, or may be different between the central portion and the end portion of the image sensor.

Note that the polarization imaging unit 20 that acquires the color polarized image is not limited to the above-described configurations, and may have another configuration as long as it can acquire the color polarized image from which the polarization information used to extract the achromatic region can be obtained. Furthermore, the color polarized image used in the information processing apparatus 30 is not limited to the case of being output from the polarization imaging unit 20 to the information processing apparatus 30. For example, in a case where a color polarized image generated by the polarization imaging unit 20 or the like is recorded on a recording medium, the color polarized image recorded on the recording medium may be read and output to the information processing apparatus 30.

The information processing apparatus 30 includes an achromatic region extraction unit 31, a gain setting unit 32, and a white balance adjustment unit 33.

The achromatic region extraction unit 31 of the information processing apparatus 30 extracts a region (achromatic region) indicating an achromatic object in the image by using the polarization information of the color polarized image acquired by the polarization imaging unit 20. The achromatic region extraction unit 31 calculates achromatic determination information for each color component of the color polarized image, for example, using the polarization information, and extracts a region satisfying a condition that the achromatic determination information is achromatic as an achromatic region. As the achromatic determination information, the degree of linear polarization DoLP indicated by the method described in <1. About Extraction of Achromatic Region> above may be calculated, and a region satisfying the Expression (11) may be extracted as an achromatic region, or two components of the Stokes vector may be used to divide one component by the other component, and a region in which a division result satisfies the Expression (15) may be extracted as an achromatic region. Note that the achromatic region is not limited to a region that satisfies Expression (11) or Expression (15), and a region in which variation between color components is within a preset achromatic region determination criterion (for example, within a range of ±α) is set as an achromatic region. The achromatic region extraction unit 31 outputs an extraction result of the achromatic region to the gain setting unit 32.

The gain setting unit 32 sets a gain for white balance adjustment on the basis of the color polarized image acquired by the polarization imaging unit 20 and the extraction result of the achromatic region output from the achromatic region extraction unit 31. The gain setting unit 32 sets the gain that makes the color polarized image of the achromatic region extracted by the achromatic region extraction unit 31 achromatic. In setting the gain, the gain may be set for each color component, or the gain of another color component may be set based on any color component. The gain setting unit 32 outputs the set gain to the white balance adjustment unit 33.

The white balance adjustment unit 33 performs gain adjustment on the color polarized image acquired by the polarization imaging unit 20 using the gain set by the gain setting unit 32, and outputs the color polarized image in which the white balance has been adjusted to an external device, for example, a display device, a recording device, or the like.

2-2. Operation of Embodiments

Figure 7:
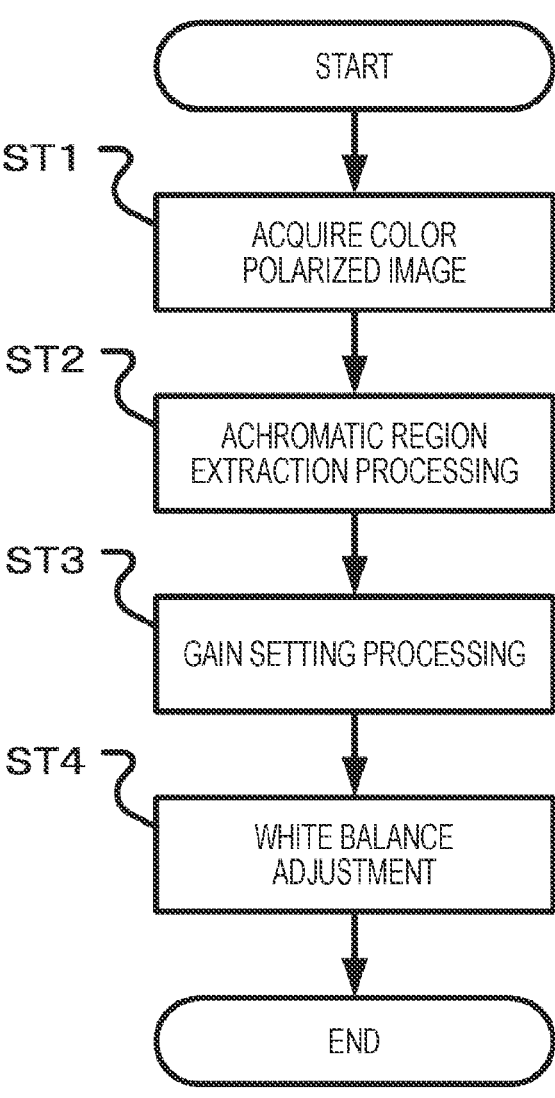
FIG. 7 is a flowchart illustrating an operation of the imaging system.

FIG. 7 is a flowchart illustrating an operation of the imaging system using the information processing apparatus of the present technology.

In step ST1, the imaging system acquires a color polarized image. The polarization imaging unit 20 of the imaging system 10 acquires a color polarized image including polarization information of a plurality of polarization directions, and proceeds to step ST2.

In step ST2, the imaging system performs achromatic region extraction processing. The achromatic region extraction unit 31 of the imaging system 10 extracts an achromatic region in The color polarized image on the basis of the polarization information of the color polarized image acquired in step ST1. As described in <1. About Extraction of Achromatic Region Using Polarization Information>, the achromatic region extraction unit 31 may extract an achromatic region using the degree of linear polarization or may extract an achromatic region using two components of the Stokes vector. The achromatic region extraction unit 31 extracts an achromatic region in the color polarized image and proceeds to step ST3.

In step ST3, the imaging system performs gain setting processing. The gain setting unit 32 of the imaging system 10 calculates a gain for each color component in which the achromatic region extracted in step ST2 becomes achromatic in the color polarized image acquired in step ST1, sets the gain to a gain used in white balance adjustment of the color polarized image acquired in step ST1 on the basis of the calculated gain, and proceeds to step ST4. Note that details of the gain setting processing will be described later.

In step ST4, the imaging system performs white balance adjustment. The white balance adjustment unit 33 of the imaging system 10 performs white balance adjustment of the color polarized image by performing level adjustment for each color component on the color polarized image acquired in step ST1 using the gain set in step ST3 in a similar manner to the related art.

As described above, according to the present technology, the white balance can be easily adjusted on the basis of the polarization information acquired from the color polarized image.

2-3. About Gain Setting Processing

Next, details of the gain setting processing will be described. In a case where there is one achromatic region extracted by the achromatic region extraction unit 31 on the basis of the polarization information acquired from the color polarized image, the gain setting unit 32 calculates a gain for each color component in which the extracted achromatic region becomes achromatic. Furthermore, the gain setting unit 32 sets the calculated gain as a gain used in the entire region in the white balance adjustment of the color polarized image.

Furthermore, in a case where an achromatic region is extracted from a color polarized image, the achromatic region extracted by the achromatic region extraction unit 31 is not limited to one region, and a plurality of regions may be detected. In such a case, the gain setting unit 32 may set the gain so that the entire plurality of achromatic regions extracted by the achromatic region extraction unit 31 becomes closest to achromatic color. For example, a gain of each color component is calculated for each achromatic region, and a statistical value representing the calculated gain, for example, an average value, a median value, or a mode value is calculated for each color component, and the calculated gain is used in the entire region of the color polarized image.

Figure 8:
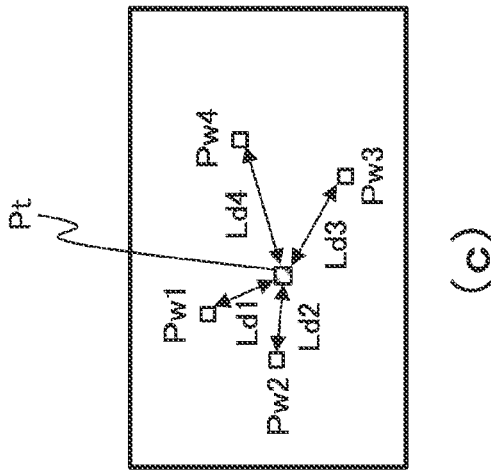
FIG. 8 is a diagram illustrating a case where a plurality of achromatic regions is detected.
Figure 8:
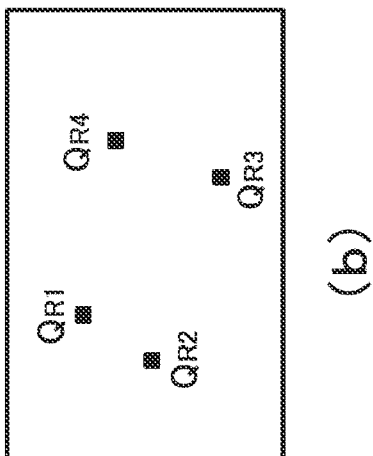

Furthermore, in a case where a plurality of achromatic regions is detected by the achromatic region extraction unit 31, a gain may be set for each extracted achromatic region. In addition, in a case where the gain is set in each extracted achromatic region, the interpolation processing may be performed using the gain set in each achromatic region, and the gain of the region different from the achromatic region may be set. FIG. 8 illustrates a case where a plurality of achromatic regions is detected, and (a) of FIG. 8 illustrates a case where four achromatic regions Pw1 to Pw4 are extracted.

In a case where a plurality of achromatic regions is detected, the gain setting unit 32 sets the gain of the white balance adjustment in a region different from the achromatic region by interpolation processing using the gains in the plurality of achromatic regions. (b) of FIG. 8 illustrates, for example, the gain for the red component. In the achromatic region Pw1, the gain of the red component set to make the achromatic region Pw1 achromatic is "QR1". In addition, the red components set to make the achromatic regions Pw2 to Pw4 achromatic are pains "QR2" to "QR4".

The gain settling unit 32 calculates the gain of the white balance adjustment in the region Pt different from the achromatic region using the weight corresponding to the distance. (c) of FIG. 8 illustrates distances "Ld1" to "Ld4" from the region Pt different from the achromatic region to the achromatic regions Pw1 to Pw4, respectively.

In this case, the calculation of Expression (16) is performed to calculate the gain "QRt" of the red component for the region Pt. Note that the coefficient ka in Expression (16) is a coefficient for normalizing the weight as illustrated in Expression (17). Furthermore, the gain setting unit 32 calculates gains of other color components for the region Pt similarly to the red component.

[Math. 5]

$$Q_{Rt} = \tag{16}$$
$$k_a\left(\frac{1}{L_{d1}}\right) \times Q_{R1} + k_a\left(\frac{1}{L_{d2}}\right) \times Q_{R2} + k_a\left(\frac{1}{L_{d3}}\right) \times Q_{R3} + k_a\left(\frac{1}{L_{d4}}\right) \times Q_{R4}$$

$$k_a = 1\left/\left(\left(\frac{1}{L_{d1}}\right) + \left(\frac{1}{L_{d2}}\right) + \left(\frac{1}{L_{d3}}\right) + \left(\frac{1}{L_{d4}}\right)\right)\right. \tag{17}$$

By performing such processing, the gain setting unit 32 performs interpolation processing using the gain set for each achromatic region, and sets the gain of a region different from the achromatic region.

Furthermore, the gain setting unit 32 may set the gain of a region different from the achromatic region on the basis of the gain of the adjacent achromatic region. In this case, the gain setting unit 32 performs clustering on the plurality of achromatic regions on the basis of the position, performs interpolation processing using the representative value of the barycentric position and the gain for each class using the representative value of the barycentric position and the gain for each class as the position and the gain of the adjacent achromatic region, and sets the gain of the region different from the achromatic region. Note that the representative value of the gain is a value representing the gain of the achromatic region in the class, and is, for example, an average value, a median value, a mode value, or the like.

Figure 9:
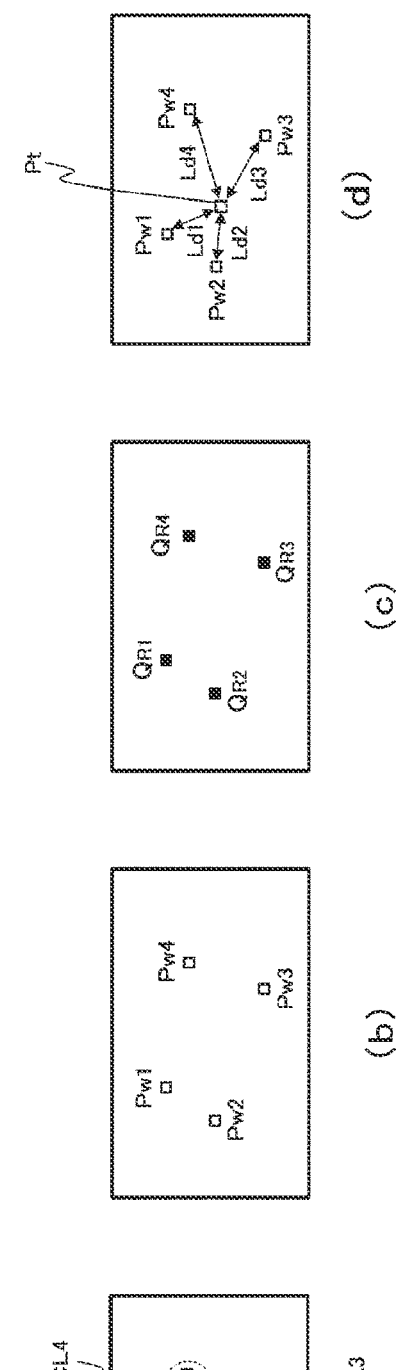
FIG. 9 is a diagram illustrating a case where clustering is performed on a plurality of achromatic regions on the basis of positions.

FIG. 9 illustrates a case where clustering is performed on a plurality of achromatic regions on the basis of positions. (a) of FIG. 9 illustrates a clustering result of a plurality of achromatic regions. For example, it is assumed that the barycentric position of the class CL1 is "PW1" and the representative value of the gain of the red component is "QR1". In addition, in a case where the barycentric position of the class CL2 is "PW2" and the representative value of the gain of the red component is "QR2", the barycentric position of the class CL3 is "PW3" and the representative value of the gain of the red component is "QR3", and the barycentric position of the class CL4 is "PW4" and the representative value of the gain of the red component is "QR4", the gain of a region different from the achromatic region can be set, similarly to the case described with reference to FIG. 8.

Furthermore, the gain setting unit 32 may perform region division of the color polarized image and set the gain in units of divided regions. For example, the gain setting unit 32 may perform region division using graph cutting, deep learning (convolutional neural network (CNN), recurrent neural network (RNN), and the like), or the like, and set a single gain for each color component in the divided region.

Figure 10:
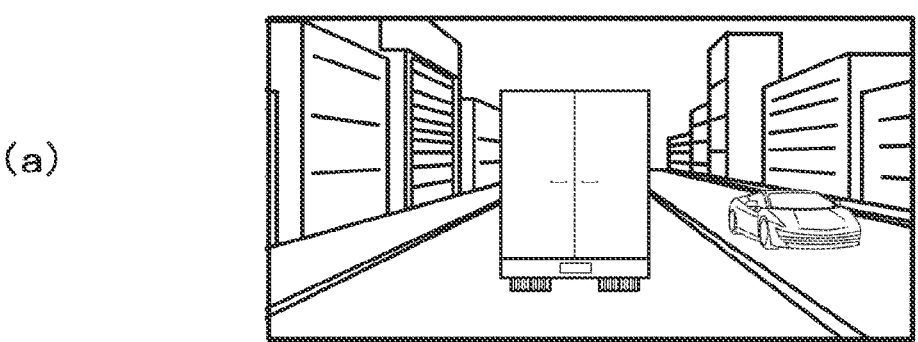
FIG. 10 is a diagram illustrating an operation in a case where region division is performed.
Figure 10:
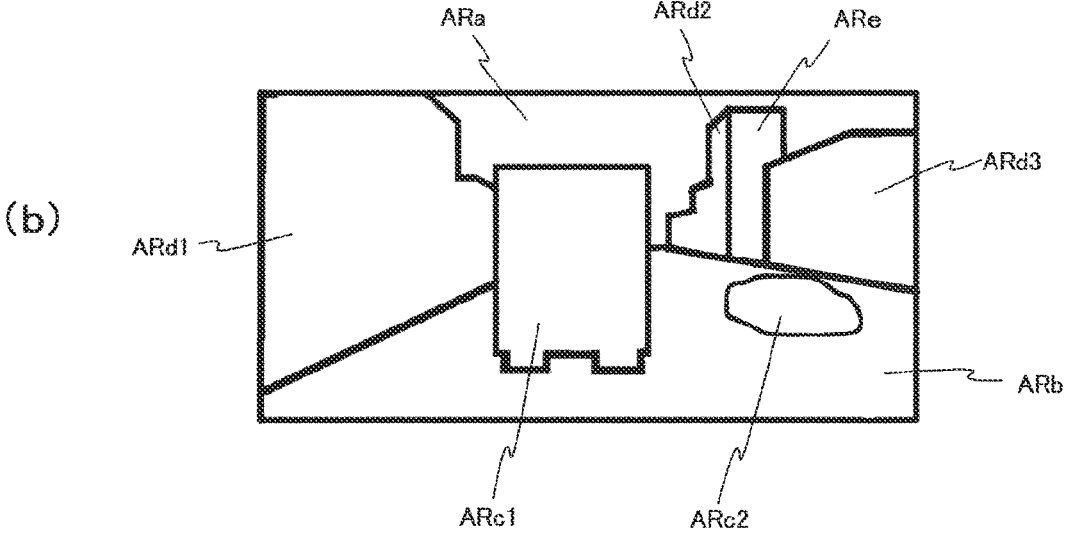

FIG. 10 illustrates an operation in a case where region division is performed. (a) of FIG. 10 illustrates a color polarized image, and (b) of FIG. 10 illustrates a region division result. Note that, in (b) of FIG. 10, a sky region ARa, a road region ARb, regions ARc1 and ARc2 indicating vehicles, regions ARd1, ARd2, and ARd3 indicating backgrounds, and a region ARe indicating buildings of achromatic colors in the background are classified. Here, in a case where the region ARe is extracted as an achromatic region, the gain of the white balance adjustment is set such that the region ARe is displayed as an achromatic color. Furthermore, the gain of the region ARe is used as the gains of the regions ARa, ARb, ARc1, ARc2, ARd1, ARd2, and ARd3.

Meanwhile, the gain setting unit 32 may select and use the above-described processing. For example, the gain setting unit 32 switches the processing according to the variation in the gain of the same color component calculated for each achromatic region, and sets the gain for the entire color polarized image in a case where the variation does not exceed a preset threshold value, and sets the gain for each pixel position or for each divided region obtained by dividing the color polarized image into a plurality of regions in a case where the variation exceeds the threshold value.

Figure 11:
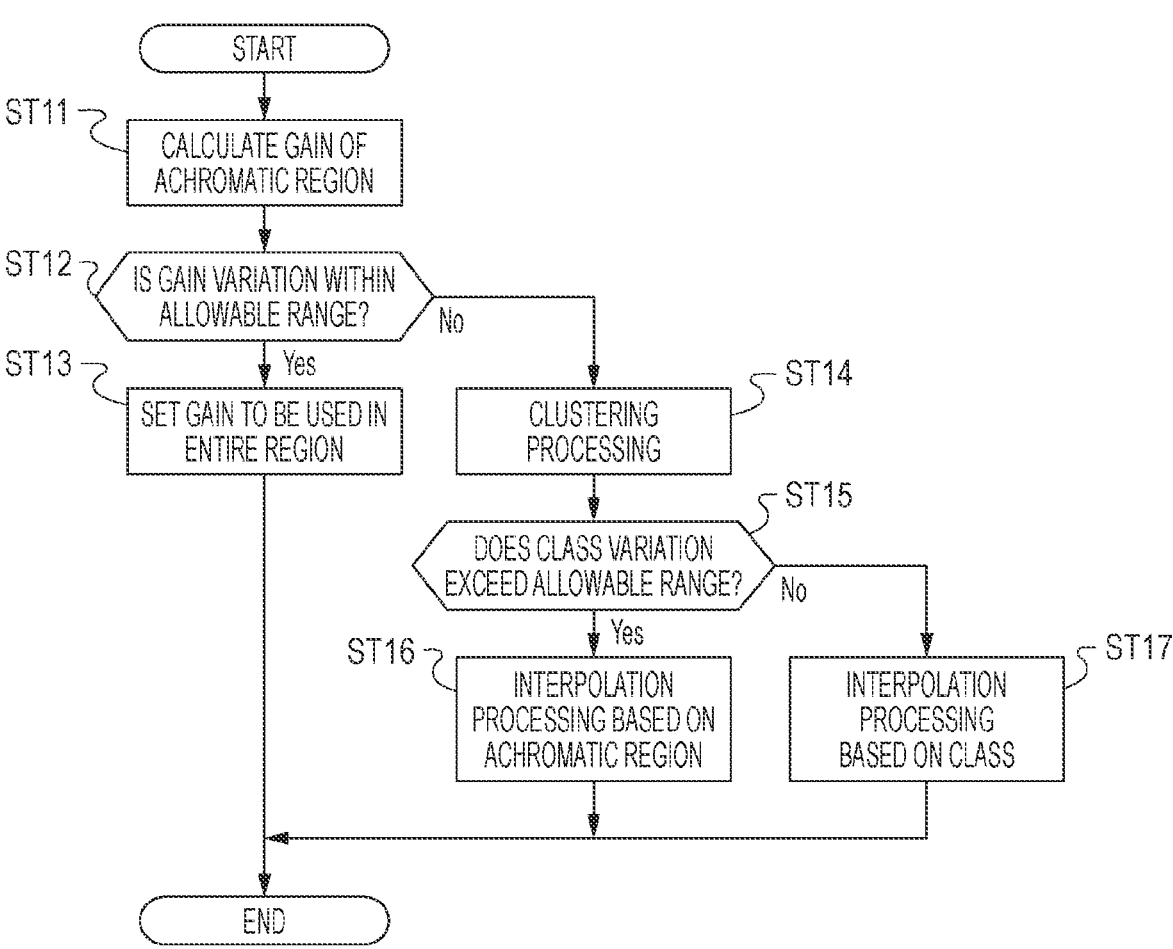
FIG. 11 is a flowchart illustrating a selection operation of gain setting processing.

FIG. 11 is a flowchart illustrating a selection operation of gain setting processing. In step ST11, the gain setting unit calculates a gain of the extracted achromatic region. The gain setting unit 32 calculates gains for the pixels in the achromatic region extracted by the achromatic region extraction unit 31, and proceeds to step ST12.

In step ST12, the gain setting unit determines whether the gain variation is within an allowable range. The gain setting unit 32 proceeds to step ST13 in a case where the variation in gain calculated in step ST11 is within a preset allowable range, that is, in a case where it can be regarded that illumination light is emitted from one light source or a plurality of light sources having a small difference in color temperature, or proceeds to step ST14 in a case where the variation exceeds the allowable range, that is, in a case where it can be regarded that illumination light is emitted from a plurality of light sources having different color temperatures.

In step ST13, the gain setting unit sets a gain to be used in the entire region. The gain setting unit 32 sets a gain to be used in the entire region of the color polarized image by statistical processing or the like of the gain calculated in step ST11. For example, the gain setting unit 32 sets any one of the average value, the mode value, the median value, and the like of the gains calculated in step ST11 as the gain to be used in the entire region of the color polarized image.

When the process proceeds from step ST12 to step ST14, the gain setting unit performs clustering processing in step ST14. The gain setting unit 32 performs clustering based on the position on the achromatic region extracted in step ST11, performs class classification of the achromatic region, and proceeds to step ST15.

In step ST15, the gain setting unit determines whether the class variation exceeds an allowable range. The gain setting unit 32 proceeds to step ST16 in a case where the gain variation within the class and between the classes exceeds a preset allowable range, and proceeds to step ST17 in a case where the gain variation is within the allowable range.

In step ST16, the gain setting unit performs interpolation processing based on the achromatic region. As described with reference to FIG. 7, the gain setting unit 32 sets the gain of the region different from the achromatic region by the interpolation operation using the gain of the achromatic region calculated in step ST11 and the distance to the achromatic region.

In step ST17, the gain setting unit performs interpolation processing based on the class. The gain setting unit 32 calculates a representative value of the barycentric position and the gain for each class classified in step ST14. Furthermore, as described with reference to FIG. 8, the gain setting unit 32 sets the gain of the region different from the achromatic region by the interpolation calculation using the representative value of the gain of the class and the distance to the barycentric position.

Figure 12:
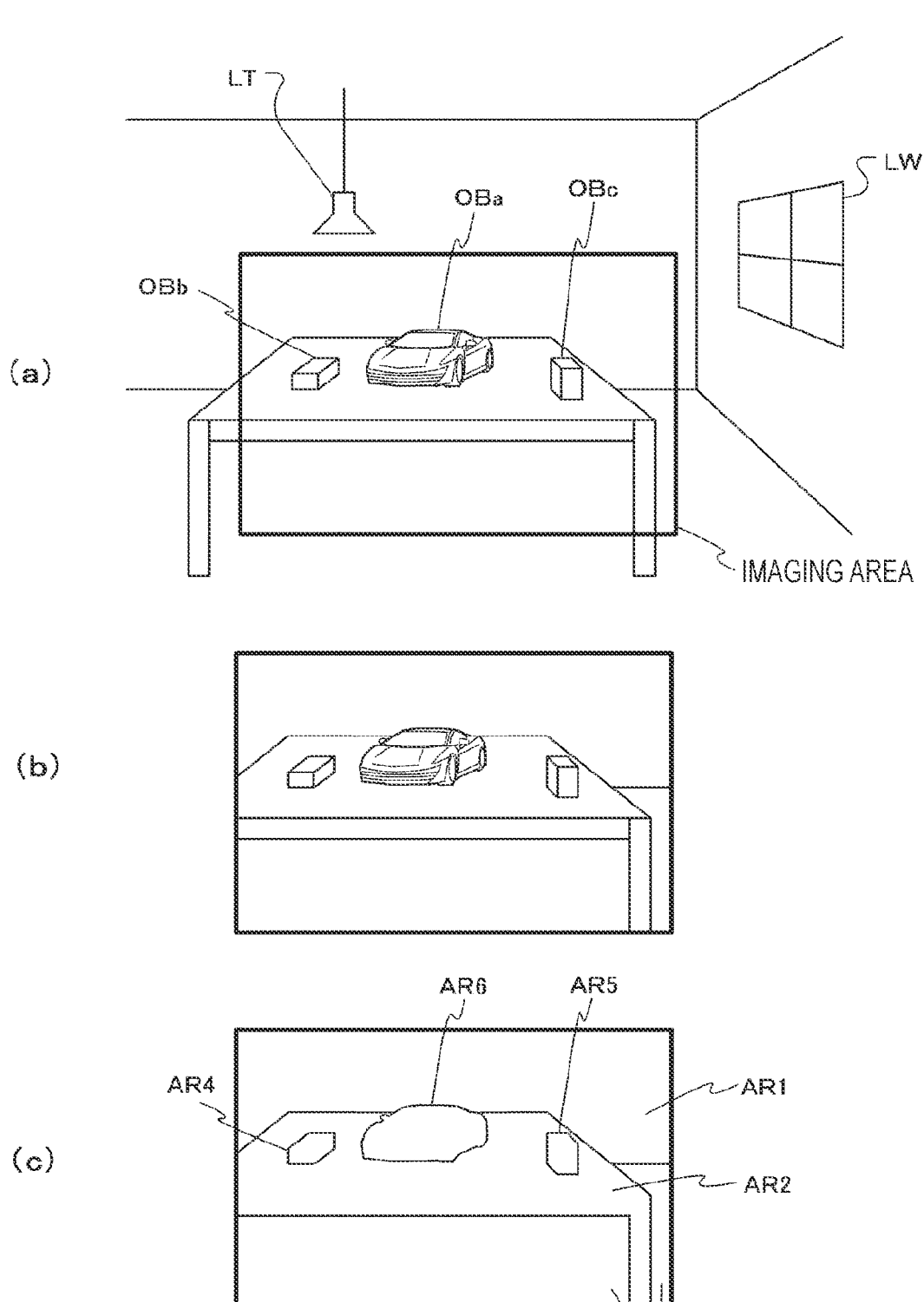
FIG. 12 is a diagram illustrating gain setting in a case where a plurality of achromatic regions is extracted.

FIG. 12 illustrates gain setting in a case where a plurality of achromatic regions is extracted. (a) of FIG. 12 illustrates an imaging scene. For example, a vehicle model OBa and achromatic objects OBc and OBd are provided on the table. In addition, the model OBa and the objects OBc and OBd on the table can be irradiated with illumination light from an illumination (for example, an incandescent lamp) LT provided in the room. In addition, the model OBa and the objects OBc and OM are irradiated with external light (for example, sunlight) incident from the window LW.

(b) of FIG. 12 illustrates a color polarized image of The imaging area in (a) of FIG. 12, and (c) of FIG. 12 illustrates a region division result. Note that, in (c) of FIG. 12, a wall region AR1, a table region AR2, a floor region AR3, regions AR4 and AR5 indicating achromatic objects, and a model region AR6 are classified. The object in the region AR4 is irradiated with illumination light from an illumination (for example, an incandescent lamp) LT provided in the room, and the object in the region AR5 is irradiated with external light (for example, sunlight) incident from the window.

In this case, the color temperature of the illumination light is different between the region AR4 and the region AR5, and for example, the Gain for the region AR4 and the gain for the region AR5 vary beyond the allowable range. Therefore, for example, the gain of the region AR6 is set by interpolation processing based on the gain for the region AR4, the gain for the region AR5, the distance to the region AR4, and the distance to the region AR5. Furthermore, gains are also set for the regions AR1 to AR3, similarly to the region AR6. Therefore, in the regions AR1 to AR3 and AR6, more natural white balance adjustment can be performed in consideration of the two types of illumination light. Note that, in a case where the illumination light is either light from the light source LT or external light, since the gains of the region AR4 and the region AR5 are substantially equal, the gain for the entire color polarized image is set.

As described above, according to the present technology, the white balance gain can be set such that an achromatic object in an imaging scene is displayed in an achromatic color by using the polarization information. Furthermore, since the polarization information is used, the white balance gain can be set such that an achromatic object is displayed in an achromatic color without considering the color temperature or the like of the light source. Furthermore, by using the polarization information, the white balance gain can be set to an optimal value for each region in the imaging scene. For example, in a case where a plurality of light sources having different color temperatures is provided, it is possible to set the white balance gain according to the color temperature of the illumination light with which the object is irradiated.

A series of processing described in the specification may be executed by hardware, software, or a composite configuration of both. In a case where the processing by the software is executed, a program in which a processing sequence is recorded is installed in a memory in a computer incorporated in dedicated hardware and executed. Alternatively, the program can be installed and executed on a general-purpose computer capable of executing various types of processing.

For example, the program can be recorded in advance in a hard disk, a solid state drive (SSD), or a read only memory (ROM) as a recording medium. Alternatively, the program may be temporarily or permanently stored (recorded) in a removable recording medium such as a flexible disk, a compact disc read only memory (CD-ROM), a magneto optical (MO) disk, a digital versatile disc (DVD), a Blu-ray Disc (BD) (registered trademark), a magnetic disk, and a semiconductor memory. Such a removable recording medium can be provided as so-called package software.

Furthermore, in addition to installing the program from the removable recording medium to the computer, the program may be transferred from a download site to the computer wirelessly or by wire via a wide area network (WAN) represented by cellular, a local area network (LAN), or a network such as the Internet. In the computer, it is possible to receive the program transferred in this manner and to install the same on a recording medium such as a built-in hard disk.

Note that the effects described in the present specification are merely examples and are not limited, and additional effects that are not described may be present. Furthermore, the present technology should not be construed as being limited to the above-described embodiments of the technology. The embodiments of this technology disclose the present technology in the form of illustration, and it is obvious that those skilled in the art may modify or replace the embodiments without departing from the gist of the present technology. That is, in order to determine the gist of the present technology, claims should be taken into consideration.

Furthermore, the information processing apparatus of the present technology may also have the following configuration.

(1) An information processing apparatus including:

an achromatic region extraction unit that extracts an achromatic region in a color polarized image by using polarization information acquired from the color polarized image; and a gain setting unit that sets a white balance gain used in white balance adjustment of the color polarized image to a white balance gain with which the achromatic region extracted by the achromatic region extraction unit is achromatic.

(2) The information processing apparatus according to (1), in which the achromatic region extraction unit calculates achromatic determination information for each color component of the color polarized image using the polarization information, and extracts a region satisfying a condition that the achromatic determination information is achromatic as the achromatic region.

(3) The information processing apparatus according to (2), in which the achromatic region extraction unit calculates a degree of linear polarization as the achromatic determination information.

(4) The information processing apparatus according to (3), in which the achromatic region extraction unit sets a region in which variation between color components of the degree of linear polarization is within a preset achromatic region determination criterion as the achromatic region.

(5) The information processing apparatus according to (2), in which the achromatic region extraction unit calculates a Stokes vector as the achromatic determination information.

(6) The information processing apparatus according to (5), in which the achromatic region extraction unit sets, as the achromatic region, a region in which variation between color components is within a preset achromatic region determination criterion with respect to a ratio of a plurality of components of the Stokes vector.

(7) The information processing apparatus according to (6), in which the achromatic region extraction unit uses a component indicating at least unpolarized luminance or average luminance as the plurality of components.

(8) The information processing apparatus according to any one of (1) to (7), in which the gain setting unit sets a white balance gain used in an entire region of the color polarized image.

(9) The information processing apparatus according to any one of (1) to (7), in which the gain setting unit sets the white balance gain for each achromatic region extracted by the achromatic region extraction unit.

(10) The information processing apparatus according to (9), in which the gain setting unit performs interpolation processing using the white balance gain set for each achromatic region, and sets a white balance gain of a region different from the achromatic region.

(11) The information processing apparatus according to (10), in which the gain setting unit performs the interpolation processing using a white balance gain of the achromatic region adjacent.

(12) The information processing apparatus according to (11), in which the achromatic region extraction unit performs class classification of the achromatic region extracted, and the gain setting unit sets a white balance gain and a position set for each class classified by the class classification as a white balance gain and a position of the achromatic region adjacent.

(13) The information processing apparatus according to any one of (9) to (12), in which the gain setting unit performs region division of the color polarized image and sets the white balance gain in units of divided regions.

(14) The information processing apparatus according to any one of (9) to (13), in which the gain setting unit switches setting of the white balance gain for the color polarized image according to variation in the white balance gain set for each achromatic region extracted by the achromatic region extraction unit.

(15) The information processing apparatus according to (14), in which the gain setting unit sets a white balance gain used in an entire region of the color polarized image on the basis or the white balance gain set for each achromatic region in a case where variation of the white balance gain is within a preset allowable range.

(16) The information processing apparatus according to (14) or (15), in which the gain setting unit sets a white balance gain of a region different from the achromatic region on the basis of the white balance gain set for each achromatic region in a case where variation of the white balance gain exceeds an allowable range.

REFERENCE SIGNS LIST

10 Imaging system
20 Polarization imaging unit

30 Information processing apparatus
31 Achromatic region extraction unit
32 Gain setting unit
33 White balance adjustment unit
201 Image sensor
202 Polarizing filter
203 Lens
204 Polarizing plate
210, 210-1 to 210-4 imaging unit
211, 212-1 to 212-4 Polarizing plate

The invention claimed is:

1. An information processing apparatus comprising:
circuitry configured to
    extract at least one achromatic region in a color polarized image by using polarization information acquired from the color polarized image, and
    set a white balance gain used in white balance adjustment of the color polarized image to a white balance gain with which the at least one extracted achromatic region is achromatic,
wherein each achromatic region is set according to variation between color components within a preset achromatic region determination criterion.

2. The information processing apparatus according to claim 1,
wherein the circuitry is further configured to
    calculate achromatic determination information for each color component of the color polarized image using the polarization information, and
    extract each region satisfying a condition that the achromatic determination information is achromatic as the at least one achromatic region.

3. The information processing apparatus according to claim 2,
wherein the circuitry calculates a degree of linear polarization as the achromatic determination information.

4. The information processing apparatus according to claim 3,
wherein the circuitry is further configured to set each region in which the variation between the color components of the degree of linear polarization is within the preset achromatic region determination criterion as the at least one achromatic region.

5. The information processing apparatus according to claim 2,
wherein the circuitry calculates a Stokes vector as the achromatic determination information.

6. The information processing apparatus according to claim 5,
wherein the circuitry is further configured to set, as the at least one achromatic region, each region in which the variation between the color components is within the preset achromatic region determination criterion with respect to a ratio of a plurality of components of the Stokes vector.

7. The information processing apparatus according to claim 6,
wherein the circuitry is further configured to use a component indicating at least one of unpolarized luminance or average luminance among the plurality of components.

8. The information processing apparatus according to claim 1,
wherein the circuitry sets the white balance gain used in an entire region of the color polarized image.

9. The information processing apparatus according to claim 1, wherein the circuitry sets the white balance gain for each extracted achromatic region.

10. The information processing apparatus according to claim 9,
wherein the circuitry is further configured to
    perform interpolation processing using the white balance gain set for each achromatic region, and
    set a white balance gain of a region different from the at least one achromatic region.

11. The information processing apparatus according to claim 10,
wherein the circuitry performs the interpolation processing using a white balance gain of at least one achromatic region adjacent to each achromatic region.

12. The information processing apparatus according to claim 11,
wherein the circuitry is further configured to
    perform class classification of each extracted achromatic region, and
    set a white balance gain and a position set for each class classified by the class classification as a white balance gain and a position of the at least one adjacent achromatic region.

13. The information processing apparatus according to claim 9,
wherein the circuitry is further configured to
    perform region division of the color polarized image, and
    set the white balance gain in units of divided regions.

14. The information processing apparatus according to claim 9,
wherein the circuitry is further configured to switch setting of the white balance gain for the color polarized image according to variation in the white balance gain set for each extracted achromatic region.

15. The information processing apparatus according to claim 14,
wherein the circuitry is further configured to set a white balance gain used in an entire region of the color polarized image based on the white balance gain set for each achromatic region in a case where variation of the white balance gain is within a preset allowable range.

16. The information processing apparatus according to claim 14,
wherein the circuitry is further configured to set a white balance gain of a region different from at least one achromatic region based on the white balance gain set for each achromatic region in a case where variation of the white balance gain exceeds an allowable range.

17. An information processing method comprising:
extracting at least one achromatic region in a color polarized image by using polarization information acquired from the color polarized image; and
setting a white balance gain used in white balance adjustment of the color polarized image to a white balance gain with which the at least one extracted achromatic region is achromatic,
wherein each achromatic region is set according to variation between color components within a preset achromatic region determination criterion.

18. A non-transitory computer-readable storage medium having embodied thereon a program, which when executed by a computer causes the computer to execute a method for white balance adjustment, the method comprising:
extracting at least one achromatic region in a color polarized image by using polarization information acquired from the color polarized image; and setting a white balance gain used in white balance adjustment of the color polarized image to a white balance gain with which the at least one extracted achromatic region is achromatic, wherein each achromatic region is set according to variation between color components within a preset achromatic region determination criterion.

\* \* \* \* \*